United States Patent [19]

Caruso

[11] 4,331,845

[45] May 25, 1982

[54] OUTPUT SWITCH ASSEMBLY AND OPERATING MECHANISM

[75] Inventor: Peter J. Caruso, Wayne, N.J.

[73] Assignee: The Bendix Corporation, Teterboro, N.J.

[21] Appl. No.: 377,729

[22] Filed: Jun. 24, 1964

[51] Int. Cl.³ .................................... H04L 9/00

[52] U.S. Cl. .................................... 200/45; 340/825.32; 434/124

[58] Field of Search .................... 200/42, 43, 44, 45; 35/4

[56] References Cited

U.S. PATENT DOCUMENTS

| | | | |
|---|---|---|---|
| 1,594,550 | 8/1926 | Norviel | 200/43 |
| 2,484,991 | 10/1949 | Giffin | 200/45 |
| 2,513,307 | 7/1950 | Gilman . | |
| 2,640,346 | 6/1953 | Giffin | 200/45 |
| 2,753,034 | 7/1956 | Hell . | |

*Primary Examiner*—Howard A. Birmiel

*Attorney, Agent, or Firm*—Anthony F. Cuoco; Vett Parsigian

[57] ABSTRACT

A mechanism comprising a code wheel assembly including an angularly movable shaft, a first element affixed to said shaft, a second element angularly movable on said shaft, and a third element angularly movable on said shaft, a plurality of main code posts preset for locking the first element and the second element in driving relation, selectively operable means for actuating the main code posts sequentially in a predetermined sense for unlocking the second and first elements, means for limiting angular movement of the second element upon the unlocking of the first and second elements, an auxiliary code post operable in a sense for locking the first element to the third element in driving relation, means for preventing the operation of said auxiliary code post in said locking sense until the actuation of the main code posts sequentially in said predetermined sense to unlock the first and second elements followed by a predetermined angular movement of the first element relative to the second element, control means selectively actuated by angular movement of the third element relative to the second element for performing a control function, and said control means being selectively actuated by said third element following the locking of the first element to the third element by the auxiliary code post and following additional angular movement of said shaft after the first element has been unlocked from the second element.

12 Claims, 5 Drawing Figures

OUTPUT SWITCH ASSEMBLY AND OPERATING MECHANISM

This invention relates to an improved output switch assembly and operating mechanism for use in an electromechanical decoder of a type disclosed and claimed in copending U.S. Applications Ser. No. 306,792, filed Sept. 4, 1963; Ser. No. 328,083, filed Dec. 4, 1963; and Ser. No. 338,483, filed Jan. 17, 1964, and more particularly to improvements in the output switch assembly and operating mechanism of the electromechanical decoder described in U.S. Application Ser. No. 371,072, filed May 28, 1964, all of which applications have been filed by Peter J. Caruso, the inventor of the present invention, and assigned to The Bendix Corporation, assignee of the present invention.

Furthermore, the present invention relates to novel means to effect sequential actuation of an output switch assembly including novel mechanical detent means to prevent inadvertent actuation of the switch assembly including means to disengage the mechanical detent means upon completion of a predetermined sequential decoding operation.

An object of the invention is to provide an output switch assembly including operating means providing maximum security protection with simplicity of concept and ease of manufacture to enhance the reliability of operation and maintainability thereof.

Another object of the invention is to provide in an electromechanical decoder of a type disclosed in the aforenoted applications, a code post selectively operable to effect driving engagement between a code wheel in the electromechanical decoder and a switch operating mechanism so as to permit the code wheel to drive the output switch to a closed position.

Another object of the invention is to provide novel switch locking means to prevent premature actuation of the switch due to extraneous influences, such as vibration, shock, or mechanical failure.

A further object of the present invention is to provide a novel detent to prevent actuation of a switch control arm into engagement with the output switch operating mechanism unless the inner and outer wheels of the code wheel assembly have been angularly actuated relative one to the other sufficiently to permit the engaging operation. Thus, in the event of an incorrect code message, the inner and outer wheels of the code wheel assembly remain in a locked relation so that the novel detent remains in a limiting relation to the code post restricting movement thereof into engaging relation with the switch operating mechanism.

Another object of the invention is to provide novel locking means to prevent an inadvertent switch closure upon bearing seizure.

Another object of the invention is to provide in the aforenoted novel locking means a scalloped disc pinned to the outer wheel element of the code wheel assembly and driven thereby in cooperative relation with another scalloped disc drivingly connected to the operating shaft of the switch assembly and so arranged that an uninterrupted outer diameter of the first disc remains engaged in a scallop on the second disc so as to prevent premature rotation of the operating shaft of the switch assembly due to extraneous mechanical transients arising through shock, vibration, or mechanical failure.

Another object of the invention is to provide an additional novel locking means effective to prevent such premature rotation of the switch operating shaft in the event of failure of the locking discs, such additional locking means including a segmental gear biased by a torsion spring against a frame stop so as to maintain the segmental gear in a toothed engaging relation with a gear keyed to the operating shaft of the switch assembly so as to prevent inadvertent actuation of the switch.

Another object of the invention is to provide in the aforenoted arrangement means effective upon completion of a correct decoding message being applied to the code wheel assembly to cause the locking scalloped discs to disengage permitting the disc on the operating shaft of the switch assembly to be operated upon a switch engaging code post being actuated so as to couple the outer wheel elements of the code wheel assembly into driving relation with the segmental gear whereupon the outer wheel elements of the code wheel assembly are effective to drive the segmental gear in opposition to the biasing force of the torsion spring away from the frame stop and thereby the operating shaft gear of the switch assembly in a switch closing sense.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

IN THE DRAWINGS

Figure 1:
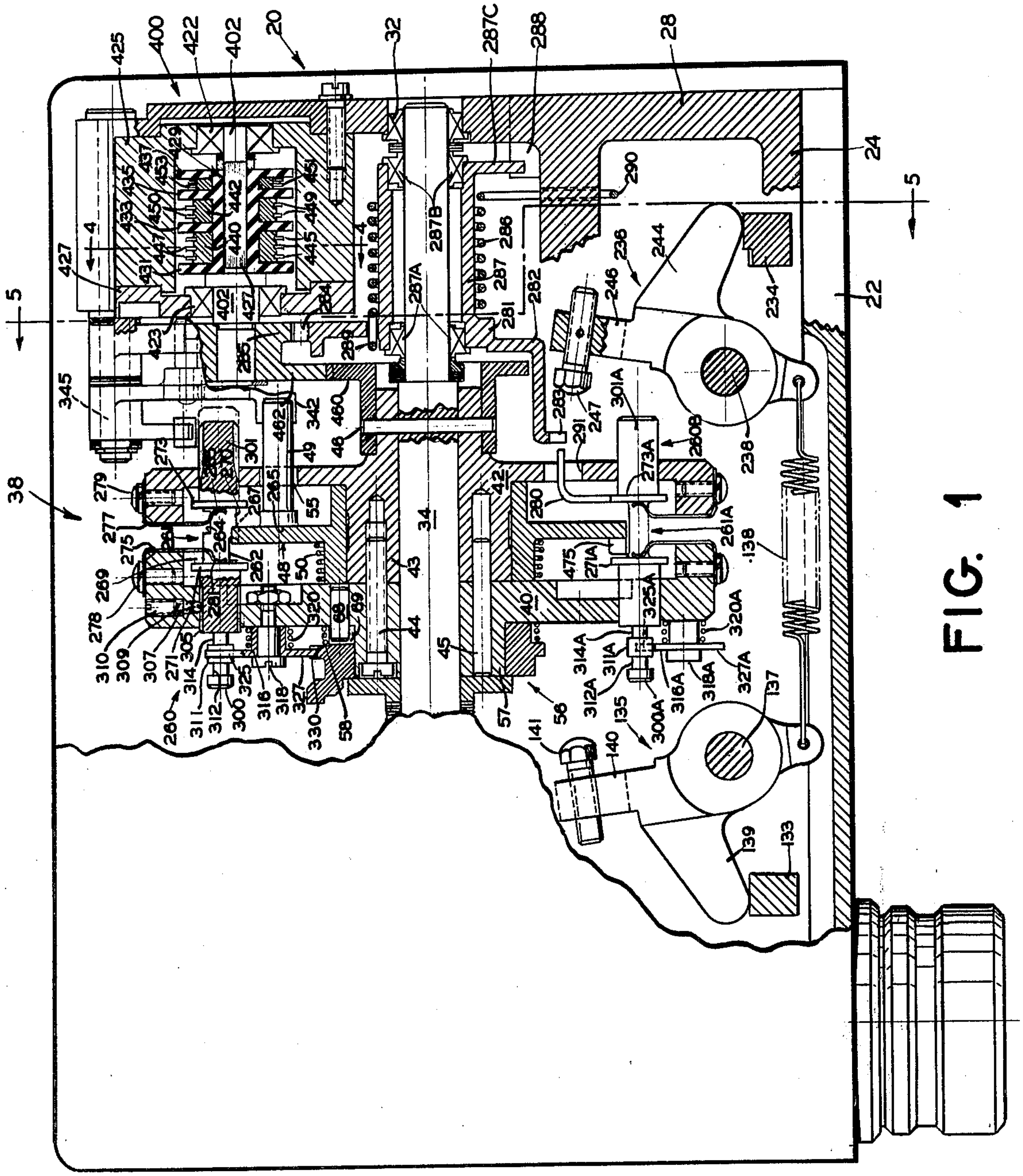
FIG. 1 is a partial sectional view of an electromechanical decoder embodying the novel switch assembly and operating mechanism of the present invention.

Referring to the drawing of FIG. 1, a decoder mechanism of the type such as disclosed in the copending U.S. Application Ser. No. 371,072 is shown housed in a casing 20 having a base 22 to which may be fastened a bulkhead 24. There may project from the bulkhead 24 opposite end portions, one of which is indicated at 28, and in which there may be rotatably mounted a shaft 34 on bearings carried by the opposite end portion and bearings 32 carried by the end portion 28. The decoder shaft 34 has secured thereto by a key a ratchet wheel, shown in the aforenoted Application Ser. No. 371,072, and there is further secured to shaft 34 a code wheel assembly 38, shown in FIG. 1.

The code wheel assembly 38, as shown in FIG. 1, includes outer wheel elements 40 and 42. The outer wheel element 42 has an annular bearing 43, as shown in FIG. 1, which is secured to the outer wheel element 40 by a bolt 44 and pin 45. The outer wheel elements 40 and 42 and bearing 43 are in turn secured to shaft 34 by a pin 46. Angularly movable on bearing 43 and within the outer wheel elements 40 and 42 is an inner wheel element 48 operatively connected to outer wheel element 40 by a light coupling spring 50 connected at one end to the inner wheel element 48 and at the opposite end to the outer wheel element 40. There projects from the inner wheel element 48 a pin 49 which is normally biased by the preload of the coupling spring 50 in an arcuate slot 55 provided in the outer wheel element 42 and in a clockwise direction, as viewed in FIG. 5, corresponding to the direction of actuation of the ratchet wheel carried by the shaft 34, as explained in the aforenoted copending Application Ser. No. 371,072.

Further, as shown in FIG. 1, there is angularly movable on a bearing 57 projecting from the outer wheel element 40 a reset wheel 56 operatively connected to the outer wheel element 40 by a coupling spring 58 connected, at one end in the outer wheel element 40 and connected at an opposite end in the reset wheel 56 so as to bias the reset wheel 56 in a direction opposite from that of the direction of actuation of the outer wheel elements 40–42 by the ratchet wheel, as explained in the Application Ser. No. 371,072.

Thus, in the form of the invention shown structurally in FIG. 1, a pin 68 projects from the outer wheel element 40 into a slot 69 in the reset wheel 56. The slot 69 cooperates with the pin 68 to limit the movement of the reset wheel 56 under the biasing force of spring 58.

As explained in the copending Application Ser. No. 371,072, actuation of the mechanism is accomplished by two stepping solenoids, designated "Mark" and "Space". Power for these solenoids is supplied by a three wire system which permits selective energization of either solenoid.

Solenoid motion is translated into wheel rotation through a series of linkages and a ratchet assembly. The ratchet assembly consists of two advance ratchets, one for each solenoid drive system and a reverse ratchet used for precise wheel positioning and overstep prevention at each station.

Energizing either solenoid advances the wheel one step and actuates the corresponding code post through suitable operating levers and knocker arms. Thus, the "Mark" stepping solenoid upon the energization thereof actuates an arm having an end portion 133, shown structurally in FIG. 1, and arranged to operatively engage a knocker arm 135 pivotally mounted on a pin 137 carried by a flange projecting from the base 22. The knocker arm 135 is biased by a spring 138 so as to maintain an end portion 139 thereof in operative engagement with the end portion 133 of the actuating arm while another end portion 140 of the knocker arm 135 has adjustably mounted thereon a knocker bolt 141 which upon energization of the "Mark" solenoid may be actuated into operative engagement with end portions 300 and 300A of the slidable main code posts 260 and switch control code posts 260A, 260B, and 260C carried by the outer wheel elements 40 and 42 of the code wheel assembly 38 to longitudinally actuate the code posts in one sense to effect the selective operation thereof, as heretofore explained in the aforenoted Application Ser. No. 306,792, filed Sept. 5, 1963, by Peter J. Caruso, and assigned to The Bendix Corporation.

Further, the "Space" stepping solenoid upon the energization thereof actuates an arm having an end portion 234 arranged to operatively contact a knocker arm 236 pivotally mounted on a pin 238 carried by a flange projecting from the base plate 22.

The knocker arm 236 is biased by the spring 138 so as to maintain an end portion 244 thereof in operative engagement with the end portion 234 of the actuating arm, while another end portion 246 of the knocker arm 236 has adjustably mounted therein a knocker bolt 247 which may be actuated by the portion 234 of the actuating arm into an operative engagement with the ends 301 and 301A of the slidable main and address code posts 260 and 260A, 260B, and 260C carried by the outer wheel elements 40 and 42 of the code wheel assembly 38.

Code Wheel Assembly

The code wheel assembly 38, as shown structurally in FIG. 1 includes a plurality of primary or main locking code posts 260 and a plurality of secondary or auxiliary code posts 260A, as hereinafter described, slidably mounted in openings, in the outer wheel element 40 and openings in the outer wheel element 42. Each of the main code posts 260 includes a member 261 positioned intermediate the opposite ends thereof having indented flat portions 262 and 264 arranged in spaced relation 180° apart. The indented portions 262 and 264 may be selectively positioned so as to so cooperate with a flange portion 265 of the inner wheel element 48 having indent portions 267 so arranged as to permit the inner wheel element 48 upon adjustment of the code post 260 in one sense, to move free of the outer wheel elements 40 and 42 against the light biasing force of the coupling spring 50, as explained in the copending U.S. Application Ser. No. 371,072.

The inner wheel element 48, as best shown in FIG. 1 includes the flange portion 265 having the indent portions 267 arranged to cooperate with raised portions 269 and 270 of the member 261 so as to lock the inner wheel element 48 in operative relation with the outer wheel elements 40 and 42 upon the main code post 260 being adjusted in a neutral position, shown in FIG. 1, or longitudinally to the left of FIG. 1, in response to an improper code bit.

The member 261 of the main code posts 260 has flange portions 271 and 273 positioned in spaced relation and so arranged as to be operatively engaged by release springs having spring legs 275 and 277. The springs are secured to the outer wheel elements 40 and 42 by bolts 278 and 279 and are so arranged that opposite end portions 281 and 285 of the spring legs 275 and 277 bear on the flange portions 271 and 273 of the member 261 so as to normally bias the main code posts 260 to the neutral position, shown in FIG. 1.

However, upon longitudinal actuation of the main code posts 260 in one sense, for example, to the right of FIG. 1, against the biasing force of spring 275, the member 261 of the main code posts will be adjusted so as to position the indent portion 262 thereof immediately adjacent the outer periphery of the flange portion 265 of the inner wheel 48 so as to release the same from a locking position relative to the outer wheels 40 and 42 and thereupon the outer diameter of the flange 265 of the inner wheel 48 is permitted to pass the code post at the indent portion. Conversely, upon actuation of the main code posts 260 in an opposite sense, for example to the left of FIG. 1, against the biasing force of the spring 277, the code posts may be so positioned that the raised portion 270 of the member 261 of the main code posts 260 is adjustably positioned in the indent portion 267 of the flange portion 265 of the inner wheel element 48 and in locking relation with the inner wheel element 48, as shown for example in FIG. 1, whereupon the outer diameter of the flange portion 265 of the inner wheel is not permitted to pass the code post 260, as explained in the aforenoted U.S. Application Ser. No. 371,072.

The code wheel assembly is composed of the outer wheel segments 40 and 42, an inner wheel 48 and twenty-seven code posts. Twenty-four (24) identical code posts are required to accommodate the unlocking code in the unit; the remaining three are special posts 260A, 260B, and 260C which are used for output switch actuation. Physically, the code posts are supported by the two segments of the outer wheel 40–42 and are located in a circle equally spaced near its periphery. The outer wheel assembly 40–42 is pinned at 46 to the center shaft 34 so that it always rotates with it.

The inner wheel 48 is mounted concentrically within the outer wheel 40–42 and can rotate relative to it. It is locked to the outer wheel 40–42 by way of the code posts 260. Its relationship to the inner wheel 48 and the code post position is established by mechanical stops between the two wheels 40–42 and 48. The light bias spring 50 assures that the wheels are always properly positioned to accept the code posts 260 upon a return to neutral, i.e. locking engagement of the inner wheel 48 after reset, once they have been separated for code output switch actuation.

The two wheels 40–42 and 48 are locked together by the code post 260 at all times when the unit is operative, except for that time when a correct code message has been decoded.

As explained in the aforenoted U.S. Application Ser. No. 371,072, the code posts 260 are operated so as to discern between a proper and an improper code bit. Assuming that the code post 260 is set for "Mark" operation pulsing the "Mark" input solenoid will cause the code post 260 to position the post cut-out 262 nearest the inner wheel 48 and directly over the inner wheel 48. That particular code post 260 will then no longer contribute to the locking of the inner wheel 48 to the outer wheel 40–42. However, if instead the space solenoid is pulsed at that same code wheel position, the same code post cut-out 262 would then be moved further away so that code post 260 will remain as a contributor to the interlocking action effected by the code posts between the two wheels 48 and 40–42.

In this connection, it should be borne in mind that the code posts 260 are all preset prior to unit closure so as to represent a series of digital 1 or 0 bits. Each code post is either set for a 1 or a 0 merely by rotating it to either of the two positions, each 180° away from the other. They are each held in position by a detent 305 under the biasing force of spring 307.

Figure 5:
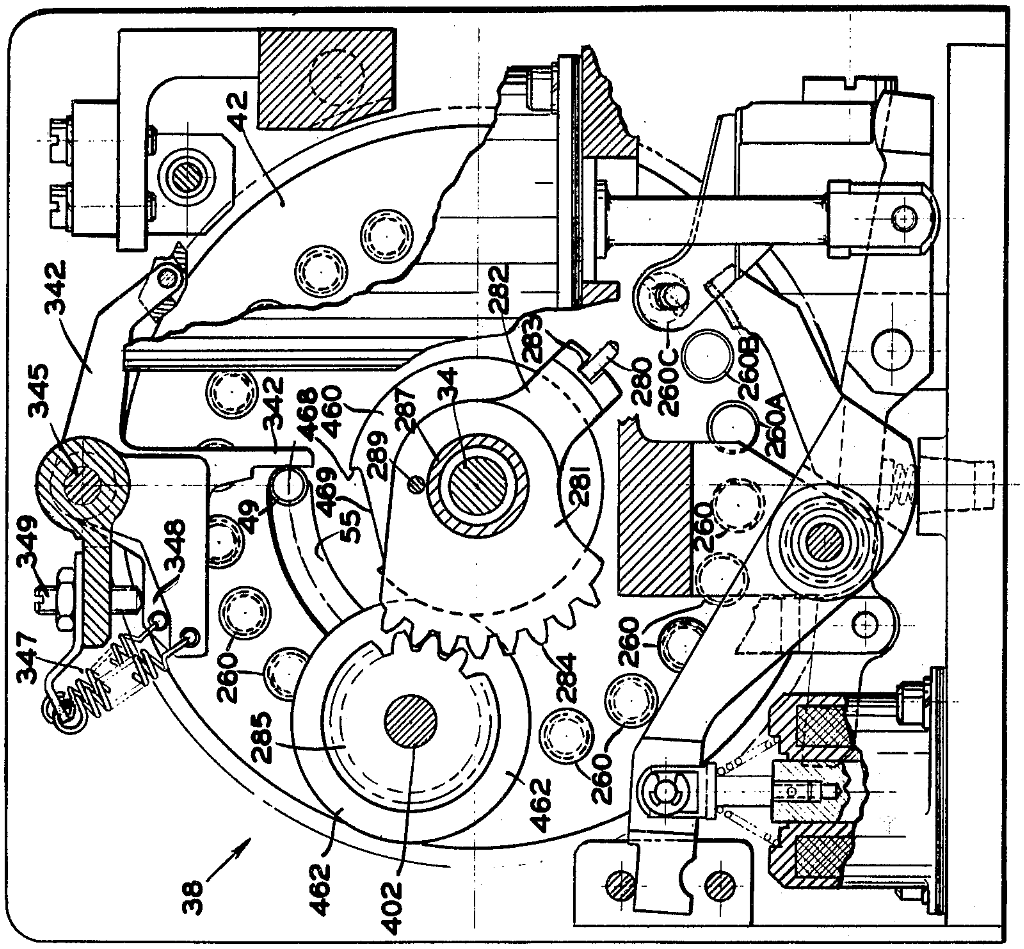
FIG. 5 is a sectional view of FIG. 1 taken along the lines 5—5 and looking in the direction of the arrows.

In the illustration of the invention herein provided, the first twenty-four of the main code parts 260 may be of identical structure, while the last auxiliary or address code posts 260A, 260B, and 260C in the twenty-fifth, twenty-sixth, and twenty-seventh positions, as shown in FIGS. 1 and 5, are so constructed as to be in an unlocking relation to the inner wheel element 48 at all times. The code posts 260A and 260C are of identical construction to that of the code post 260B, shown in FIG. 1, except that the code posts 260A and 260C effect no control action and do not include a switch control arm such as the arm 280 which projects from the code post 260B.

A segmental gear element 281 is angularly movable on the shaft 34 and has a flange portion 282 in which there is provided in the periphery thereof an indent or slot 283. The segmental gear element 281 has a toothed portion 284 arranged in engaging relation with a toothed portion of a switch operating gear 285, as shown in FIGS. 1 and 5. Further, a spring 286 is coiled about a hub portion 287 of the gear 281 which is supported by bearings 287A-287B on the shaft 34. The spring 286 biases an arm 287C projecting from the hub portion 287 of the segmental gear 281 into engaging relation with a stop 288 projecting from the end portion 28. The segmental gear element 281 is biased by the spring 286 in a counterclockwise direction, as viewed in FIGS. 3 and 5 about the shaft 34. The spring 286 is connected at one end 289 to the segmental gear 281 and at the opposite end 290 to the end portion 28.

The member 261A of the auxiliary code post 260B, as shown in FIG. 1, includes flange portions 271A and 273A mounted in spaced relation on the code post 260B and so arranged that the switch control arm 280 projecting from the flange portion 273A may be adjustably positioned through a slot 291 in the outer wheel element 42 into engaging relation in the indent 283 of the flange portion 282 of the segmental gear 281. The control arm 280 is positioned in a disengaging relation to the indent 283 of the flange portion 282 when in the normal neutral position shown in FIG. 1. However, upon a longitudinal movement of the auxiliary code posts 260B to the right, as shown in FIG. 1, the free end of the arm 280 will lock in the indent 283 of the flange portion 282 so as to lock the segmental gear element 281 to the outer wheel element 40–42.

Corresponding parts in the code post 260B to those described with reference to the code post 260 have been identified in FIG. 1 by like numerals bearing the suffix A.

Thus, a nonswitch selecting code signal causing the knocker arm 236 to actuate the code post 260B to the left will cause the code post 260B to remain in an unlocked relation to the indent 283 in the flange portion 282 of the segmental gear 281, while a switch selecting code signal will cause the knocker arm 135 to actuate the auxiliary address code post 260B to the right from the neutral position shown in FIG. 1, into a locking position relative to the indent or slot 283 in the flange portion 282 of the segmental gear element 281. This locking action of the auxiliary code post 260B will then drivingly connect the outer wheel elements 40–42 to the segmental gear element 281 to effect angular movement thereof in a clockwise direction, as viewed in FIG. 5, relative to the inner wheel element 48 to follow the clockwise step action of the outer wheel elements 40–42 upon the pin 49 engaging the locking arm 342 and the outer wheel elements 40–42 being unlocked from the inner wheel element 48, as explained in the aforenoted U.S. Application Ser. No. 371,072.

Such clockwise angular movement of the segmental gear element 281 relative to the inner wheel element 48 will in turn effect a selective operation of a switch assembly 400 having an operating shaft 402 drivingly connected through gear 285 to the segmental gear element 281.

The auxiliary address code posts 260A, 260B, and 260C in the twenty-fifth, twenty-sixth, and twenty-seventh positions of the code wheel assembly 38 have a predetermined and fixed relation to a particular switch function, as hereinafter explained.

The main code posts 260, however, may be selectively rotated 180° by a remote code change mechanism, shown in FIG. 5, as explained in the U.S. Application Ser. No. 328,083, so as to change the operative relation thereof from that shown in FIG. 1. The detent portion 264 would then be operative upon actuation of the main code post 260 to the left to release the inner wheel element 48. While the raised portion 269 would be operative to retain the inner wheel element 48 and the outer wheel elements 40 and 42 in a locked relation upon actuation of the main code post 260 longitudinally to the right.

The actuation of the main code posts 260 in the one and other senses described in reference to FIG. 1 may be selectively effected by the knocker arm 135, and the knocker arm 236, as shown in FIG. 1, and the code wheel assembly 38 may be rotated in a step action by the pawl actuating mechanism in operative relation with the ratchet wheel on the shaft 34, as explained in the copending U.S. Application Ser. No. 371,072.

The auxiliary code posts 260A, 260B, and 260C may be similarly selectively actuated by the knocker arms 135 and 236 from the neutral position shown in FIG. 1, but only the code post 260B carrying the control arm 280 may be actuated so as to position the control arm 280 in a locking relation between the segmental gear 281 and the outer wheel elements 40 and 42 after receipt of a predetermined code signal so as to effect a selective operation of the switch mechanism 400, as hereinafter explained, while remaining in an unlocked relation upon receipt of a nonswitch selecting code signal.

Selective energization of the "Mark" and "Space" solenoids control respectively the knocker arms 135 and 236 and the tension applied to the code wheel advance springs. While upon de-energization of the selected solenoid, the energy stored in the code wheel advance spring becomes effective to actuate the pawl actuating mechanism, as explained in the U.S. Application Ser. No. 371,072 to thereby cause a ratchet wheel carried by shaft 34 to move the code wheel assembly 38 to the next succeeding position with a step action.

Further, each of the main code posts 260 includes an end portion 300 protruding from the outer wheel element 40 and arranged for selective operation by the end portion 140 of the knocker arm 135, as shown in FIG. 1, while the opposite end of the main code post 260 includes an end portion 301 protruding from the outer wheel element 42 and arranged for actuation by the end portion 246 of the knocker arm 236, as shown in FIGS. 1 and 5.

In an end portion of the main code post 260, there are arranged longitudinal slots 305, as possibly best shown in FIG. 1. Cooperating with the slots 305 is a ball detent 307 biased by a spring 309 held by a bolt 310 so as to releasably resist angular rotation of the main code post 260 and thereby maintain the same in an angularly adjusted position in the outer wheel elements 40 and 42.

Further, at the end portion 300 of the main code posts 260, there is provided, as shown in FIG. 1, a flange portion 311 and indent portions 312 and 314 arranged in spaced relation so as to cooperate with a locking detent member 316, as shown in FIG. 1, upon actuation of the main code posts 260 in one or the other of the longitudinal senses as illustrated and explained in the U.S. Application Ser. No. 306,792, and in the U.S. Application Ser. No. 371,072.

The auxiliary code posts 260A, 260B, and 260C, as shown in FIG. 1, have arranged in cooperative relation with a locking detent 316A a similar flange portion 311A and indent portions 312A and 314A to that of the main code posts 260. Corresponding parts are indicated in the auxiliary code posts 260B by corresponding numerals to which has been added the suffix A for the parts of the auxiliary code posts 260B.

Each of the locking detent members 316 are pivotally mounted by a bolt 318 in the outer surface of the outer wheel element 40 and located radially inward of the code posts 260. The locking detent members 316 are biased by a spring 320 so as to bias the end portion 325 of the locking detent member 316 into cooperative engagement in the indent portion 312 or 314, as the case may be, upon longitudinal actuation of the code posts 260 from the neutral position, shown in FIG. 1, to one or the other of the locking positions. The opposite end portion 327 of each detent member 316 is positioned in a recess 330 formed in the periphery of the reset wheel 56, as shown in FIG. 1, and explained in the aforenoted U.S. Application Ser. No. 371,072.

As distinguished from the locking detent members 316 for the main code posts 260, the locking detent member 316A for the auxiliary code post 260B, as shown in FIG. 1, is pivotally mounted by a bolt 318A secured in the outer surface of the outer wheel element 40 and located radially outward of the code post 260A. The locking detent member 316A is biased by a spring 320A having one end engaged in the outer surface of the wheel element 40 and another end bearing on the detent member 316A so as to bias the end portion 325A of the locking detent member 136A into cooperative engagement in the indent portion 312A or 314A, as the case may be, upon longitudinal actuation of the code post 260B from the neutral position, shown in FIG. 1, to one or the other of the locking positions.

The code posts 260A and 260C have a corresponding detent locking structure and the opposite end portion 327A of each of the detent members 316A for the code posts 260A, 260B, and 260C extends beyond the perimeter of the outer wheel element 40, and is arranged in cooperative relation with an end portion of a pivotal spring biased detent release pawl, as explained in copending U.S. Application Ser. No. 371,072.

Further, as shown in FIGS. 1 and 5, there projects from the inner wheel element 48 a pin 49 which extends through the arcuate slot 55 in the outer wheel element 42 into engaging relation with a stop arm 342 pivotally mounted on a bolt 345 projecting from the end plate 28, as shown in FIG. 1 so as to limit the extent of angular movement of the code wheel assembly 38 in a clockwise direction by the stepping action of the pawl mechanism.

Thus in the event the outer wheel elements 40 and 42 remain in a locked relation with the inner wheel element 48 following receipt of a faulty decoding message, the pin 49 operatively engages the stop arm 342 which is biased into operative engagement therewith by a spring 347. The spring 347 normally holds a portion 348 of the arm 342 in abutting relation with a stop bolt 349, as shown in FIG. 5. The force asserted by the code wheel advance spring is sufficient, however, to overcome the biasing force of the spring 347 whereupon the arm 342 effects a step operation of a counting mechanism, as explained in the U.S. Application Ser. No. 371,072, which is thereafter effective to lock the decoding mechanism from further operation until a return to the safe, home, or null position, as therein explained.

Furthermore, after a predetermined number of unsuccessful attempts to operate the decoder mechanism, the counting mechanism will render effective a timer to render the operating mechanism for the decoder unit ineffective over a predetermined time interval, as therein explained.

However, upon a proper decoding message being received by the decoder unit causing the locking posts 260 to be selectively actuated so as to unlock the inner wheel element 48 from the outer wheel elements 40 and 42 and permit free angular movement of the outer wheel elements 40 and 42 relative to the inner wheel element 48 upon the completion of the decoding message at which time the pin 49 of the inner wheel element 48 operatively engages the stop arm 342, the biasing force asserted by the spring 347 is sufficient to hold the stop arm 342 against the biasing force of light coupling spring 50 while the biasing force asserted by the code wheel advance spring is sufficient to overcome the resilient force applied through the light coupling spring 50 to the inner wheel element 48 so as to permit further angular movement of the outer wheel elements 40 and 42 relative to the inner wheel element 48 held by the stop arm 342.

Thus, the inner wheel element 48 is held by the pin 49 engaging the stop 342 under the biasing force of spring 347 while the outer wheel elements 40 and 42 of the code wheel assembly 38 may continue to be driven by the step actuating pawls while the pin 49 is arcuately movable in the slot 55 and the control arm 280 may be adjustably positioned through the slot 29 so as to lock the segmental gear 282 to the outer wheel element 40–42 to effect the desired operation of the selector switch 400.

Figure 2:
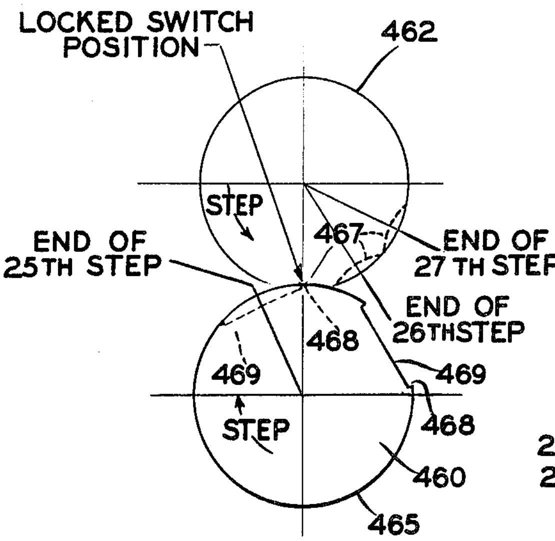
FIG. 2 is an end view illustrating the novel scalloped disc locking mechanism of the present invention.

The code post 260B, as shown in FIG. 2, is so arranged that, in the neutral position, the same is held in unlocked relation to the segmental gear element 281. Thus, a code signal selectively applied, for example, through the "Space" solenoid so as to cause the knocker arm 236 to actuate code post 260B in a longitudinal sense to the left will cause the code post 260B to remain in an unlocked relation with respect to the segmental gear element 281. However, if a code signal is applied, for example, to the "Mark" solenoid so as to cause the knocker arm 135 to actuate code post 260B in an opposite longitudinal sense to the right so as to cause the member 261A to actuate the control arm 280 projecting from the flange portion 273A into locking relation with the indent portion 283 of the flange portion 282 of the second inner wheel element 280, such action will cause the code post 260A to lock the segmental gear element 281 to the outer wheel elements 40 and 42. This action will then prevent any further angular advance of the outer wheel elements 40 and 42 relative to the segmental gear element 281 under the biasing force of the code wheel advance spring, while permitting the angular movement of the outer wheel elements 40 and 42 relative to the inner wheel element 48.

In the event that the twenty-fifth, twenty-sixth, and twenty-seventh code signals are properly applied, the outer wheel elements 40 and 42, together with the shaft 34 are step actuated by the selective actuation of the stepper pawls so as to effect selective operation of the control switch mechanism 400, as hereinafter explained.

The selective actuation of the "Space" and "Mark" solenoids will provide the required decoding message to effect the unlocking action of the main code posts 260 of the outer wheel elements 40 and 42 relative to the inner wheel element 48 as well as the selective actuation of the address auxiliary code posts 260A, 260B, 260C to effect selective operation of the control switch mechanism 400, as hereinafter explained. The selective actuation of the "Space" and "Mark" solenoids effecting the decoding message may be provided by the selective operation of suitable switches controlling energizing circuits for the respective solenoids, as explained in the aforenoted U.S. Application Ser. No. 371,072.

Selective Switch Control Mechanism

Upon the outer wheel elements 40 and 42 being unlocked from the inner wheel element 48, the further angular adjustment of the outer wheel element 40 and 42 relative to the inner wheel element 48 through the pawl actuating mechanisms causes the shaft 34 to be angularly adjusted so as to in turn control the rotary switch assembly 400 upon the switch control arm 280 being actuated into a driving relation with the segmental gear element 281 as the code posts 260A, 260B, and 260C are sequentially actuated, as herein specified.

The switch assembly 400 includes a shaft 402 rotatably supported by bearings 422, 423 carried by a casing 425 and an end plate 427 of the switch assembly, as shown in FIG. 1. Fastened to the shaft 402 by splines 427 is an annular member 429 formed of a suitable electrical insulating material having annular ribs 431, 433, 435, and 437. Embedded in the electrical insulating material 429 and between the ribs 431–433, 433–435, and 435–437 are segmental conductors 440, 442, and 444, respectively, arranged so as to cooperate with spring contact brushes 445–447, 449–450, 451–453, respectively, embedded in suitable electrical insulating blocks 454 and 455 secured in the casing 425 by bolts 456 and 457, respectively, as shown in FIG. 4.

Figure 4:
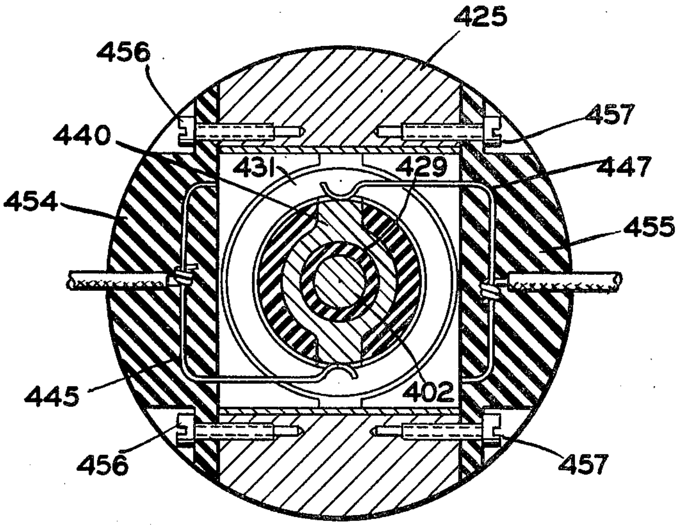
FIG. 4 is a sectional view of the switch assembly taken along the lines 4—4 of FIG. 1 and looking in the direction of the arrows.

The operative arrangement of one pair of the spring switch contacts 445–447 in relation to the segmental switch contactor 440 is shown in FIG. 4. The other pairs of spring contacts 445–447, 449–450, 451–453 are similarly arranged in relation to the respective segmental contacts 440, 442, and 444.

The arrangement is such that the switch arms 445–447, 449–450, and 451–453 are effective to close the segmental contacts 440, 442, and 444, respectively, upon the shaft 402 being angularly adjusted to a predetermined position, such as for example, the 27th bit position of the code wheel assembly 38 as sensed by the angular adjusted position of the shaft 402 of the switch assembly 400 through the segmental gear 281 and gear 285 connected to the operating shaft 402 of the switch assembly 400.

Locking Mechanism for the Output Assembly

Without the locking features hereinafter described, a seizure of either bearing 287A or 287B might possibly cause the segmental gear 281 to drive the switch operating gear 285 so as to cause an inadvertent closure of the switch assembly 400 before a decoding operation of the code wheel assembly 38 has been completed. This possible malfunction during the decoding portion of a message (correct or incorrect) i.e. up to and including the 24th decoding step is prevented by the provision of a pair of novel scalloped discs 460 and 462, shown in FIGS. 1 and 2. The scalloped disc 460 is drivingly connected to the shaft 34 and outer wheel elements 40–42 by the pin 46 and would be driven by the code wheel through the twenty-four steps. Through these twenty-four steps, an uninterrupted circumferential edge 465 of the disc 460 driven by shaft 34 remains in engaging relation in a scallop 467 formed in the disc 462 which is keyed to the operating shaft 402 of the switch assembly 400. The engagement of disc 460 in the scallop 467 of the disc 462 acts to prevent actuation of the operating switch shaft 402 due to extraneous mechanical transients such as shock, vibration, or mechanical failure.

Figure 3:
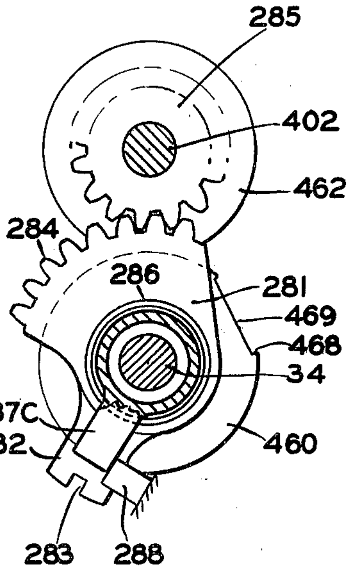
FIG. 3 is an end view of a segmental gear for operating the switch assembly and showing the same biased by a torsion spring against a frame stop and remaining engaged with a gear keyed to the operating shaft of the switch assembly so as to prevent rotation of the switch by extraneous transients such as shock, vibration, or mechanical failure.

Moreover, in the event of a failure of the pin 46 connecting disc 460 to shaft 34, a redundant locking effect is provided through the action of the arm 287C of segmental gear 281 which is held under the biasing force of the torsion spring 286 against the frame stop 288, as shown in FIG. 3. In such case, the segmental gear 281 is locked in toothed engagement with the switch operating gear 285 connected to the operative shaft 402 of the switch assembly 400 so as to prevent actuation of the switch operating shaft 402 throughout the twenty-four decoding steps of the code wheel assembly 38. Upon completion of the decoding message, i.e. the twenty-four decoding steps, the outer wheel 40–42 of the code wheel assembly 38 is unlocked from the inner wheel 48 and is thereupon free to rotate upon receipt of the next successive steps. Upon completion of the 25th decoding step and actuation of the blind auxiliary code post 260A, together with the subsequent stepping action of the shaft 34, the scalloped disc 460 is thereupon so angularly positioned by the step actuation of the shaft 34 in a clockwise direction, as viewed in FIG. 2, that a leading edge 468 of a scallop 469 provided in the disc 460 is positioned at least half way within the scallop 467 in the disc 462, as indicated by dotted lines on FIG. 2, so as to thereby free the disc 462 for angular adjustment upon the next succeeding twenty-sixth and twenty-seventh decoding steps, as hereinafter explained.

In this connection, it should be noted, however, that up to this point, no rotation of the switch operating shaft 402 has been possible since the switch operating arm 280 has not as yet been brought into operative engagement in the detent 283 of the segmental gear 281. The code post 260B carries the switch operating arm 280 so that when the code post 260B is actuated (26th step) by the "Mark" solenoid operated knocker arm 135, the code post 260B is shifted longitudinally toward the right, as shown in FIG. 1, so as to cause the switch control arm 280 to engage in the slot 283 of the segmental gear 281 which is thereupon step actuated in a clockwise direction, as viewed in FIG. 5, upon completion of the 26th step, at which time the disc 460 keyed to the shaft 34 will also be actuated in a clockwise direction so as to reposition the scallop 469, indicated in dotted lines in FIG. 2, in a clockwise direction into cooperative relation with the disc 462 so as to permit the free actuation thereof.

Thus, at the completion of the 26th step, the operating shaft 402 of switch assembly 400 has been rotated approximately one half the required motion to effect switch closure. Thereafter, motion imparted by the segmental gear 281 through the switch operating gear 285, in the succeeding 27th step, completes the required motion of the shaft 402 to effect closure of the switch assembly 400 in which the spring switch arms 445–447, 449–450, and 451–452 are effective to close the respective switch segments 440, 442, and 444.

A further feature of the invention includes a segmental flange 475 carried by the inner wheel 48 adjacent the flange portion 271A of the code post 260B and arranged to limit actuation of the code post 260B longitudinally to the right so as to prevent engagement of the control arm 280 with the segmental gear 281 so long as the outer wheel element 40–42 are in locked relation with the inner wheel element 48. However, upon the inner wheel elements 40–42 being operatively disconnected from the inner wheel element 48 by the proper code operation of the code posts 260 and thereafter the outer wheel elements 40–42 being angularly adjusted relative to the inner wheel element upon the twenty-fifth step operation, the angular adjustment of the outer wheel elements 40–42 will cause the flange portion 271A to be positioned out of the limiting relation with the flange 475 so as to permit the longitudinal adjustment of the code post 260B to the right on the twenty-sixth step.

However, with an input of an incorrect code message or prior to angular movement of the outer wheel elements 40–42 relative to the inner wheel element 48, the segmental flange 475 remains in the limiting relation with the flange portion 271A of the code post 260B thereby restricting its motion.

It will be seen then that the segmental flange 475, as well as the scalloped discs 460 and 462 which serve to normally prevent inadvertent switch actuation will be disengaged at the completion of the 25th advance step. The 26th and 27th bit steps serve, respectively, to initiate and complete the actual closure of the switch assembly 400. Insertion then of a "Mark" bit at the 26th bit position causes the knocker arm 135 to actuate the special code post 260B at that station and thereby the switch control arm 280 into engaging relation in the slot 283 of the switch actuating arm or segmental gear 281. Once thus engaged, the segmental gear 281, gear 285, and shaft 402 are coupled to the outer wheel elements 40-42 of the code wheel assembly 38 so as to drive the output switch mechanism 400 to a closed position, as shown in FIG. 4.

The three circuits controlled by the switch assembly 400 are protected from shorting one to another by dielectric barriers molded as an integral part of the commutator. Each of the three circuits will have a pair of redundant brushes, i.e. one more set of brushes than is normally required to safely carry the applied electrical load to the electrical device controlled thereby. In all three circuits, the total number of brushes, providing a common contact function in a particular circuit, will be connected in parallel. The redundant brush in each set of contacts will provide reliable switch operation in the event of an electrical failure or intermittent in any one of the remaining brushes. The same redundancy approach will be used for the external leads to the switch circuits.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A mechanism comprising a code wheel assembly including an angularly movable shaft, a first element affixed to said shaft, a second element angularly movable on said shaft, and a third element angularly movable on said shaft, a plurality of main code posts preset for locking the first element and the second element in driving relation, selectively operable means for actuating the main code posts sequentially in a predetermined sense for unlocking the second and first elements, means for limiting angular movement of the second element upon the unlocking of the first and second elements, an auxiliary code post operable in a sense for locking the first element to the third element in driving relation, means for preventing the operation of said auxiliary code post in said locking sense until the actuation of the main code posts sequentially in said predetermined sense to unlock the first and second elements followed by a predetermined angular movement of the first element relative to the second element, control means selectively actuated by angular movement of the third element relative to the second element for performing a control function, and said control means being selectively actuated by said third element following the locking of the first element to the third element by the auxiliary code post and following additional angular movement of said shaft after the first element has been unlocked from the second element.

2. A mechanism comprising a code wheel assembly including an angularly movable shaft, a first element affixed to said shaft, a second element angularly movable on said shaft, and a third element angularly movable on said shaft, a plurality of main code posts preset for locking the first element and the second element in driving relation, selectively operable means for actuating the main code posts sequentially in a predetermined sense for unlocking the second and first elements, means for limiting angular movement of the second element upon the unlocking of the first and second elements, an auxiliary code post operable in a sense for locking the first element to the third element in driving relation following the actuation of the main code posts sequentially in said predetermined sense to unlock the first and second elements and a predetermined angular movement by said shaft of the first element relative to the second element, control means selectively actuated by angular movement of the third element relative to the second element for performing a control function, a first disc, a second disc, said first disc being drivingly connected to said shaft, means to operatively connect said second disc to said control means, said first disc being arranged in locking relation to said second disc so as to prevent inadvertent actuation of said control means, said first disc including means for releasing said second disc from said locking relation upon the predetermined angular movement by said shaft of the first element relative to the second element, and said control means being selectively actuated by said third element following the locking of the first element to the third element by the auxiliary code post and following additional angular movement of said shaft after the first element has been unlocked from the second element.

3. A mechanism comprising a code wheel assembly including an angularly movable shaft, a first element affixed to said shaft, a second element angularly movable on said shaft, and a third element angularly movable on said shaft, a plurality of main code posts preset for locking the first element and the second element in driving relation, selectively operable means for actuating the main code posts sequentially in a predetermined sense for unlocking the second and first elements, means for limiting angular movement of the second element upon the unlocking of the first and second elements, an auxiliary code post operable in a sense for locking the first element to the third element in driving relation, means for preventing the operation of said auxiliary code post in said locking sense until the actuation of the main code posts sequentially in said predetermined sense to unlock the first and second elements followed by a predetermined angular movement of the first element relative to the second element, control means selectively actuated by angular movement of the third element relative to the second element for performing a control function, a first disc, a second disc, said first disc being drivingly connected to said shaft, means to operatively connect said second disc to said control means, said first disc being arranged in locking relation to said second disc so as to prevent inadvertent actuation of said control means, said first disc including means for releasing said second disc from said locking relation upon the predetermined angular movement by said shaft of the first element relative to the second element, and said control means being selectively actuated by said third element following the locking of the first element to the third element by the auxiliary code post and following additional angular movement of said shaft after the first element has been unlocked from the second element.

4. A mechanism comprising a code wheel assembly including an angularly movable shaft, a first element affixed to said shaft, a second element angularly movable on said shaft, and a third element angularly movable on said shaft, a plurality of main code posts preset for locking the first element and the second element in driving relation, selectively operable means for actuating the main code posts sequentially in a predetermined sense for unlocking the second and first elements, means for limiting angular movement of the second element upon the unlocking of the first and second elements, an auxiliary code post operable in a sense for locking the first element to the third element in driving relation following the actuation of the main code posts sequentially in said predetermined sense to unlock the first and second elements and predetermined angular movement by said shaft of the first element relative to the second element, control means selectively actuated by angular movement of the third element relative to the second element for performing a control function, means for limiting angular movement of the third element in one sense, spring means for biasing said third element in said one sense into engaging relation with said limiting means so as to prevent inadvertent actuation of said control means, and said control means being selectively actuated by said third element following the locking of the first element to the third element by the auxiliary code post and following additional angular movement of said shaft after the first element has been unlocked from the second element.

5. A mechanism comprising a code wheel assembly including an angularly movable shaft, a first element affixed to said shaft, a second element angularly movable on said shaft, and a third element angularly movable on said shaft, a plurality of main code posts preset for locking the first element and the second element in driving relation, selectively operable means for actuating the main code posts sequentially in a predetermined sense for unlocking the second and first elements, means for limiting angular movement of the second element upon the unlocking of the first and second elements, an auxiliary code post operable in a sense for locking the first element to the third element in driving relation, control means selectively actuated by angular movement of the third element relative to the second element for performing a control function, locking means for preventing inadvertent actuation of said control means until there has been effected a predetermined angular movement by said shaft of the first element relative to the second element, and said control means being selectively actuated by said third element following the locking of the first element to the third element by the auxiliary code post and following additional angular movement of said shaft after the first element has been unlocked from the second element.

6. The combination defined by claim 5 in which said locking means includes a flange carried by said second element for preventing the operation of said auxiliary code post in said locking sense until the actuation of the main code post sequentially in said predetermined sense has been effected to unlock the first and second elements and there has been effected a predetermined angular movement by said shaft of the first element relative to the second element.

7. The combination defined by claim 5 in which said locking means includes a first disc, a second disc, said first disc being drivingly connected to said shaft, means to operatively connect said second disc to said control means, said second disc including a scallop portion, said first disc being arranged in locking relation in said scallop portion of the second disc so as to lock said second disc and thereby said control means from inadvertent actuation, and said first disc includes a second scallop portion arranged to be operatively positioned relative to said second disc upon a predetermined angular adjustment of the shaft so as to release said first disc from said locking relation to said second disc.

8. The combination defined by claim 5 in which said locking means includes means for limiting angular movement of the third element in one sense and spring means for biasing said third element in said one sense into engaging relation with said limiting means so as to prevent inadvertent actuation of said control means.

9. A decoding mechanism comprising a code wheel assembly including a first element, a second element, and a third element, main code post means normally positioned for locking the first and second elements in driving relation, selectively operable means for actuating the main code post means in a predetermined sense for unlocking the first and second elements, auxiliary code post means effective upon the first and second elements being in an unlocked relation, said auxiliary code post means being operable by said selectively operable means in one sense for locking said first and third elements and in another sense to retain said first and third elements in said unlocked relation, means actuated by the third element for performing a control function upon the first element being locked in driving relation with the third element by the selective operation of the auxiliary code post means in said one sense, locking means for preventing operation of said control means, and means operatively positioned by said first element for releasing said locking means.

10. A decoder mechanism comprising a first element, a second element, and a third element, a plurality of members for locking the first element and the second element in driving relation, selectively operable means for actuating the locking members in a predetermined sense for unlocking the first and second elements, an auxiliary member operable for selectively locking the first element to the third element following actuation of the locking members sequentially in said predetermined sense to unlock the first and second elements, control means selectively actuated by the third element for performing a control function, said control means being selectively actuated by said third element following the selective locking of the first element to the third element by the auxiliary member and after the unlocking of the first element and the second element, a first locking plate operatively connected to said first element, a second locking plate operatively connected to said third element, said locking plates being cooperatively arranged so as to prevent inadvertent actuation of said control means, and said first locking plate being adjustably positioned by said first element in relation to said second plate so as to release said second plate from said locking relation to permit operation of said control means by said third element.

11. A decoder mechanism comprising a first element, a second element, and a third element, a plurality of members for locking the first element and the second element in driving relation, selectively operable means for actuating the locking members in a predetermined sense for unlocking the first and second elements, an auxiliary member operable for selectively locking the first element to the third element following actuation of the locking members sequentially in said predetermined sense to unlock the first and second elements, control means selectively actuated by the third element for performing a control function, said control means being selectively actuated by said third element following the selective locking of the first element to the third element by the auxiliary member and after the unlocking of the first element and the second element, locking means operatively connected between said first and third elements to prevent inadvertent actuation of said control means, and means adjustably positioned by said first element for rendering said last-mentioned locking means ineffective at a predetermined adjusted position of said first element.

12. A mechanism comprising a code wheel assembly including an angularly movable shaft, a first element affixed to said shaft, a second element angularly movable on said shaft, and a third element angularly movable on said shaft, a plurality of main code posts preset for locking the first element and the second element in driving relation, selectively operable means for actuating the main code posts sequentially in a predetermined sense for unlocking the second and first elements, means for limiting angular movement of the second element upon the unlocking of the first and second elements, an auxiliary code post operable in a sense for locking the first element to the third element in driving relation, means for preventing the operation of said auxiliary code post in said locking sense until the actuation of the main code posts sequentially in said predetermined sense to unlock the first and second elements followed by a predetermined angular movement of the first element relative to the second element, control means selectively actuated by angular movement of the third element relative to the second element for performing a control function, a first disc, a second disc, said first disc being driving connected to said shaft, means to operatively connect said second disc to said control means, said first disc being arranged in locking relation to said second disc so as to prevent inadvertent actuation of said control means, said first disc including means for releasing said second disc from said locking relation upon the predetermined angular movement by said shaft of the first element relative to the second element, means for limiting angular movement of the third element in one sense, spring means for biasing said third element in said one sense into engaging relation with said limiting means so as to prevent inadvertent actuation of said control means, and said control means being selectively actuated by said third element following the locking of the first element to the third element by the auxiliary code post and following additional angular movement of said shaft after the first element has been unlocked from the second element.

* * * * *